March 22, 1932.    T. H. THOMAS    1,850,609
BRAKE DEVICE
Filed Feb. 14, 1929
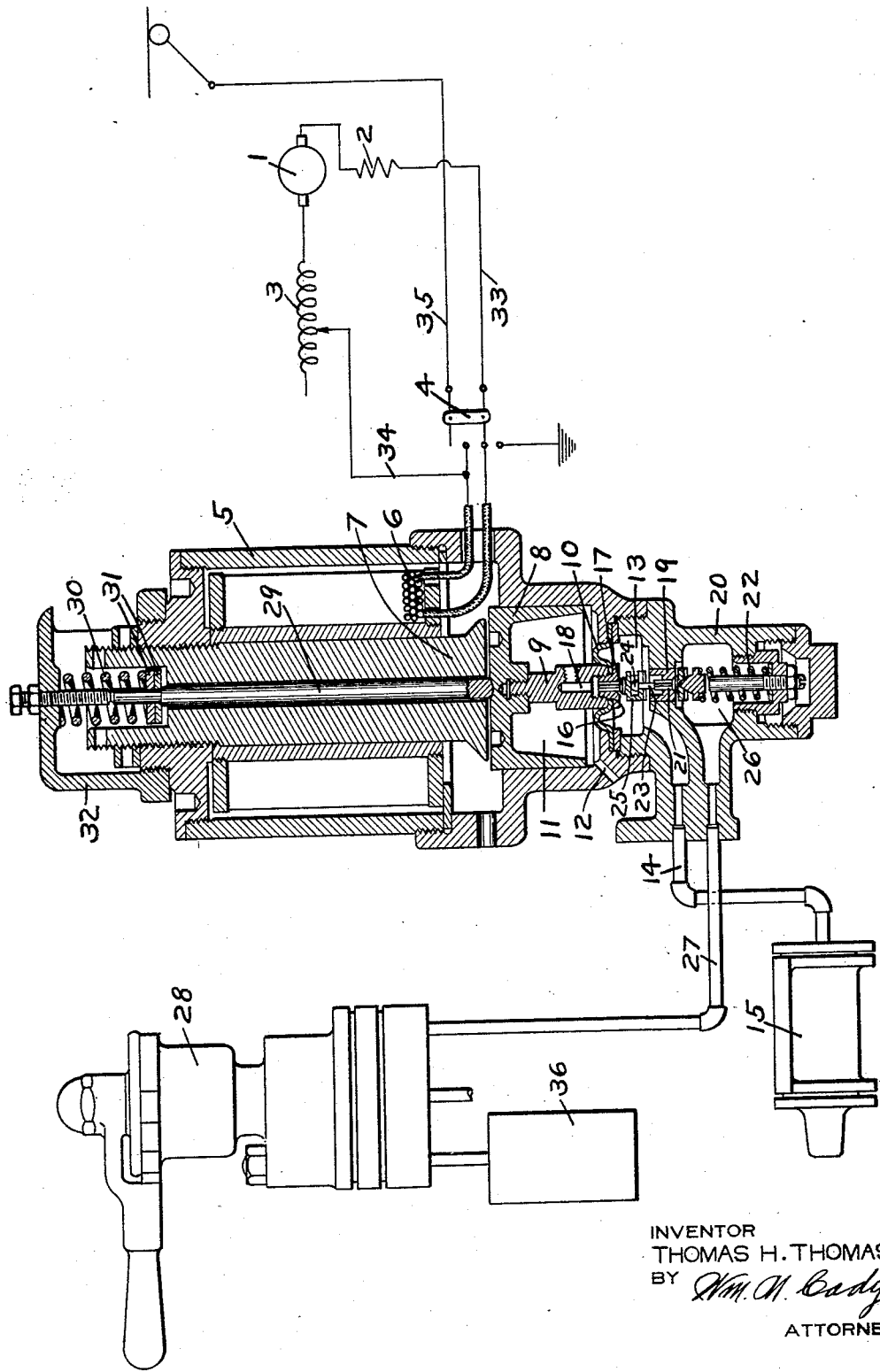
INVENTOR
THOMAS H. THOMAS
BY *Wm. N. Cady*
ATTORNEY Patented Mar. 22, 1932

1,850,609

UNITED STATES PATENT OFFICE

THOMAS H. THOMAS, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA

BRAKE DEVICE

Application filed February 14, 1929. Serial No. 339,791.

This invention relates to dynamic braking equipment for railway trains and has for its principal object to provide an apparatus in which the retarding force of the dynamic brake is automatically supplemented by the retarding force of a fluid pressure brake as the retarding force of the dynamic brake decreases.

In the accompanying drawing, the single figure is a diagrammatic view, partly in section, of a combined dynamic and fluid pressure brake apparatus embodying my invention.

My invention may be employed in connection with any desired type of dynamic brake equipment, and for the purpose of explaining the operation of my invention, it is not deemed necessary to show such a brake in detail. Accordingly, in the drawing I have merely shown a few of the elements of the brake, such as the motor having the armature 1 and field coil 2, a variable resistance 3, and a brake controlling switch 4.

According to my invention, a magnet valve device is provided comprising a magnet 5 having a magnet coil 6 and a pole piece 7. Adjacent to the end of the pole piece 7 is an armature 8 and secured to said armature is a stem 9 which is secured at its lower end to a flexible diaphragm 10.

The chamber 11 formed intermediate the armature 8 and the diaphragm 10 is open to the atmosphere by way of port 12. The chamber 13 at the opposite side of the diaphragm 10 is connected, through pipe 14, with a brake cylinder 15.

A threaded plug 16 clamps the stem 9 to the diaphragm 10 and said plug is provided with a seat for an exhaust valve 17, which controls communication from chamber 13 to chamber 11, by way of passage 18.

In alinement with the valve 17 is a bushing 19, secured in a partition wall of casing 20, and said bushing is provided with a seat for a supply valve 21, which is subject to the pressure of a spring 22 tending to seat the valve.

The valve 21 is provided with a stem 23 having a button 24 at its upper end, which engages in a recess of a cage 25, secured to the valve 17. Chamber 26 of the casing 20 is connected to a pipe 27 which leads to a brake valve device 28.

Extending through a central bore of the pole piece 7 is a rod 29, the lower end of which engages the armature 8. A spring 30 engages washers 31 which rest on a shoulder provided at the upper end of the rod and the upper end of the spring engages a cap 32, which is secured to the magnet 5. The pressure of the spring 30 thus acts through the rod 29 to urge the armature 8 away from the pole piece 7.

When the vehicle is being run under power, the braking switch 4 is in the position such that in power positions of the usual controller (not shown) the wire 33 is connected to ground and the wire 34 is connected to the trolley wire 35. The circuit through the magnet coil 6 is open at the switch 4, so that current will not flow through the coil.

When it is desired to apply the brakes, the switch 4 is shifted to the position shown in the drawing, so that the wire 33 is connected to the magnet coil 6 and the circuit to the trolley wire 35 is opened. The connections are set up so that the car motors act as generators to effect dynamic braking of the car and current generated by the motors acting as generators flows through the magnet coil 6.

The brake valve device is moved to application position, in which fluid under pressure is supplied from the main reservoir 36 to pipe 27 and chamber 26. The magnet coil 6 is energized by the current generated in dynamic braking so that the armature 8 is held in the position shown in the drawing by the magnetic pull of the pole piece 7, and the valve 21 is held seated by the spring 22, while the armature 8 holds the diaphragm 10 and the seat of valve 17 away from the valve 17. The chamber 13 and the brake cylinder 15 are thus connected to chamber 11 and the atmosphere through port 12 and consequently the fluid pressure brakes remain released, so long as the magnet coil 6 is held sufficiently energized.

As the train slows down to a low speed, for example, five miles per hour, the motors acting as generators in the dynamic braking circuit do not generate sufficient current to maintain the magnet 5 energized with such strength as to hold the armature against the pressure of spring 30.

As a consequence, the armature 8 is moved downwardly by the spring, first causing the seat in the bushing 16 to engage the release valve 17, so as to cut off the atmospheric exhaust from chamber 13 and then upon a further downward movement, the supply valve 21 is unseated, so that fluid under pressure is supplied from chamber 26 to chamber 13 and thence to the brake cylinder 15.

The brakes are thus applied by fluid under pressure and the brake cylinder pressure is built up until the fluid pressure in chamber 13 acting on diaphragm 10 is sufficient to cause the upward movement of the diaphragm, so that the supply valve 21 is permitted to seat and thus cut off the further flow of fluid under pressure to the brake cylinder.

The magnetic pull of magnet 5 on the armature 8 is proportional to current supplied from the dynamic brake circuit and the parts may be so designed that the braking power due to the fluid under pressure supplied to the brake cylinder is inversely proportional to and compensates for the falling off of the dynamic braking power, due to the slowing down of the train. In other words, the fluid pressure brake automatically supplements the dynamic brake, so as to maintain the full braking power until the train has been brought to a full stop.

While running with the controller in a power-on position, the circuit through the magnet coil 6 is maintained open at the switch 4 and consequently the armature 8 is maintained in its lower position by the action of spring 30. The release valve 17 will then be held seated while the supply valve 21 is held unseated.

It will thus be seen that a fluid pressure brake application may be obtained at any time, if the magnet 5 is deenergized, by moving the brake valve handle of the brake valve device 28 to application position, in which fluid under pressure is supplied from the main reservoir 36, through ports in the brake valve device to pipe 27 and chamber 26 and thence flows past the open valve 21 to chamber 13 and the brake cylinder 15.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with an electro-dynamic brake apparatus, of a brake cylinder, an electro-magnet connected in the circuit of said brake apparatus, valve means for controlling the supply of fluid under pressure to the brake cylinder, and a movable abutment subject to the opposing pressures of the brake cylinder and a pressure which varies inversely as the magnetic pull of the magnet for directly actuating said valve means.

2. The combination with an electro-dynamic brake apparatus, of a brake cylinder, a valve for controlling the supply of fluid under pressure to the brake cylinder, a valve for controlling the release of fluid under pressure from the brake cylinder, a movable abutment subject to brake cylinder pressure for actuating said valves, and electro-magnet controlled means connected in the circuit of said brake apparatus, for exerting a pressure on said abutment in opposition to brake cylinder pressure, which pressure increases as the magnetic pull of said magnet decreases.

In testimony whereof I have hereunto set my hand, this 12th day of February, 1929.

THOMAS H. THOMAS.